Aug. 8, 1933.  C. H. WEBBEKING  1,921,899
MICROMETER CALIPER ATTACHMENT
Filed Jan. 15, 1932
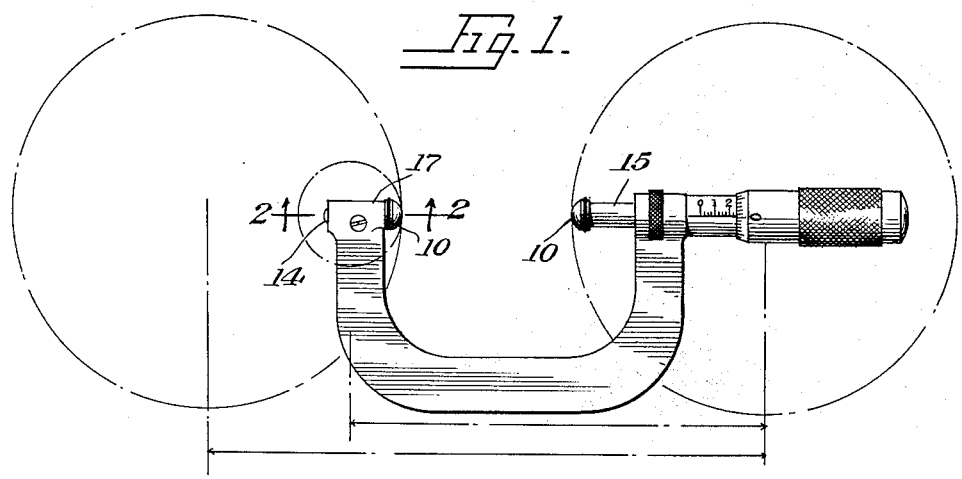
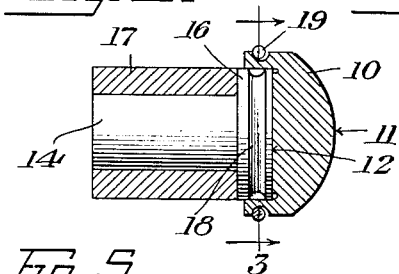
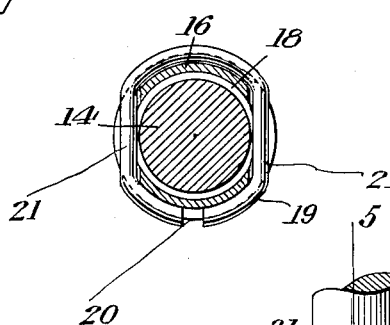
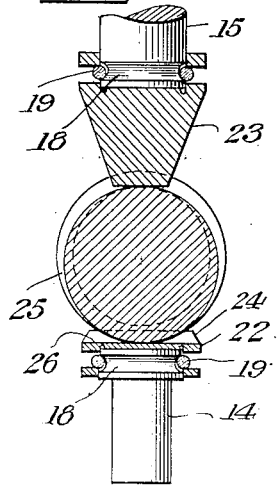
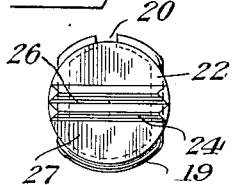
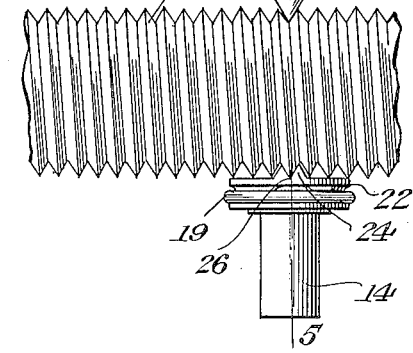
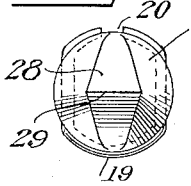
Carl H. Webbeking INVENTOR
BY Victor J. Evans & Co.
ATTORNEYS Patented Aug. 8, 1933

1,921,899

UNITED STATES PATENT OFFICE 1,921,899

MICROMETER CALIPER ATTACHMENT

Carl H. Webbeking, Waterloo, Iowa

Application January 15, 1932. Serial No. 586,816

1 Claim. (Cl. 33—167)

The object of the invention is to provide an attachment for use in connection with the conventional micrometer caliper to convert the latter into a device whereby the center spacing of two holes, such as the openings in a gear box, may be determined with a fine degree of accuracy, or the exact position of the center of a hole definitely determined with reference to a flat surface and without the necessity for the use of a surface gauge; to provide an attachment which may be readily placed on and securely but removably latched to the anvil and spindle of a micrometer caliper; and generally to provide an attachment of this character which is of simple form and susceptible of cheap manufacture.

With this object in view, the invention consists in a construction and combination of parts of which a preferred embodiment is illustrated in the accompanying drawing but to which the invention is not to be restricted further than is required by any limitations appearing in the appended claim.

In the drawing:

Figure 1 is an elevational view of a micrometer caliper showing the invention applied in operative position thereon and employed to determine the center spacing of two holes.

Figure 2 is a sectional view, enlarged, on the plane indicated by the line 2—2 of Figure 1.

Figure 3 is a sectional view on the plane indicated by the line 3—3 of Figure 2.

Figure 4 is an elevational view of a screw showing the anvil and spindle attachments employed to determine the diameter of the screw at the roots of the threads.

Figure 5 is a sectional view on the plane indicated by the line 5—5 of Figure 4.

Figure 6 is a bottom plan view of one of the thread measuring attachments.

Figure 7 is a similar view of the other of the thread measuring attachments.

Except for thread measuring and flat surface measuring, the invention is in the form illustrated in Figures 1 to 3 and consists of a cap-like device 10 formed with a spherical face 11 and a flat rear face 12, the latter being the bottom wall of a socket in which either the anvil 14 seats, or the spindle 15, the devices being preferably used in pairs with one seated on the anvil and the other on the spindle.

The anvil is customarily formed with a head 16 to provide a shoulder for abutting engagement with the yoke 17, so that it may be definitely positioned in the yoke with respect to the spindle by bringing the shoulder down against the yoke. The head of the anvil is peripherally grooved as indicated at 18 and the spindle is correspondingly grooved adjacent its free edge. It is the conventional practice to so form the anvil and spindle and this groove provides a convenient means for the retention of the attachment when mounted, the attachment being formed with a peripheral groove on the outer surface of the socket wall and having a spring loop 19 seated in this groove. The loop, however, is an open loop, its extremities being separated as indicated at 20 and it is of generally oval form with straight sections 21 on diametrically opposite sides. The seating groove for the spring loop in the attachment is cut through the wall of the socket on diametrically opposite sides on lines parallel with the diameter, so that the flat portions of the loop may invade the socket and thus find a seat in the groove 18 in the anvil or on the spindle. The spring loop thus serves to secure the attachment by engagement in the groove 18, bringing the bottom wall 12 against the face of the anvil for that attachment applied to the latter and to the end of the spindle in that attachment applied to it.

The attachment shown at 10 is made with a definite thickness from the wall 12 to the peak of the spherical face, say a quarter of an inch. Thus when attached to the anvil and spindle, the measured distance as indicated by the setting of the micrometer screw will be, if the attachments used are a quarter of an inch thick, one half an inch greater than the actual distance, so that this amount is deducted from the micrometer reading to learn the actual distance.

In Figure 1 the device is shown for determining the distance between two openings, the diameters of which, of course, are known. The micrometer is positioned so that the anvil and spindle will both enter the two holes whose spacing is to be determined and the spindle will be set up to bring the attachment firmly against the curved surfaces, so that there may be no play of the yoke. The distance between the centers of the two holes will then be represented by the micrometer reading from which must be subtracted twice the thickness of the attachment, as above indicated, and to this result there is then added the sum of the radii of the two holes.

While the spring loop secures the attachments to the spindle and anvil, the grooves in the two latter will permit angular or turning movement of the attachments when mounted which makes possible the embodiment of the invention as an attachment for definitely measuring the diameter of a screw at the roots of a thread as indicated in Figure 4. The thread measuring attachments indicated at 22 and 23 are employed in pairs, attachable to the spindle and anvil, just as is the form of attachment shown at 10. One of the thread measuring elements, however, is formed on its work contacting face with parallel ribs 24, cross-sectionally web shaped, so that this may enter between the threads of a screw such as that indicated at 25. The bottom of the crotch 26 formed by the two ribs, however, crosses the center of the spindle or anvil to which the attachment is applied and lies in the same plane with the flat faces 27 formed on opposite sides of the ribs. The attachment 23 is of generally conical form with flat sides 28 terminating in a sharp straight edge 29 which is perpendicular to the axis of the spindle or anvil of the caliper on which it may be used.

The attachment 22 is designed to sit on the outer edges of the threads of the screw 25 and the attachment 23 to enter between the threads on the diametrically opposite side to carry the straight edge 29 to the root of the thread. Both the attachments 23 and 22 are made to a definite thickness between the work engaging faces and the spindle and anvil engaging faces. Thus when a screw, such as the screw 25, is measured, the sum of these two distances is subtracted from the micrometer reading and this result subtracted from the amount representing the diameter of the screw on the exterior of the thread. This then will represent the depth of the thread and when doubled, may be subtracted from the outside diameter of the screw, which will give the diameter at the roots of the thread.

The attachment being susceptible of angular movement on the spindle or anvil, as above described, the micrometer screw may be set up after the attachment enters between the threads by reason of this possible rotary motion between the attachment and the micrometer spindle.

The invention having been described, what is claimed as new and useful is:

The plane of the center line of the peripheral groove on the attachment and the plane of the rear face of the latter have a separation slightly less than the plane of the center line of the groove on the anvil or spindle and the plane of the work engaging face of either, so that action of the spring in seeking to reach the bottom of the groove on the spindle or anvil, has a tendency to pull the back face of the attachment down flat against the anvil or spindle work engaging face.

An attachment for application to a micrometer caliper where the spindle and anvil are peripherally grooved adjacent their work engaging faces, the same comprising a socketed member for seating on the anvil or spindle, and a spring loop carried by said member and engageable in the groove of that element of the micrometer to which it is attached, said socketed member being formed with a peripheral groove on the exterior surface of its wall and the center line of said groove lying in a plane parallel with the bottom wall of the socket but separated from the latter a less distance than the planes of the center lines of the grooves on the spindle and anvil are separated from their respective work engaging faces, the socketed member having its groove cut through the socket wall on diametrically opposite sides and the spring loop being seated in said groove and having spaced portions invading the socket at the points where the wall of the latter is cut through, so that said portions may engage in the groove in the spindle or anvil to one side of the center of the same and thus draw the socketed member down tight against the work engaging face thereof.

CARL H. WEBBEKING.